May 15, 1956 G. F. DEVINE ET AL 2,745,954

INTERCARRIER WAVE TRANSLATION CIRCUITS

Filed Oct. 29, 1952 2 Sheets-Sheet 1

Inventors:
George F. Devine,
Raymond F. Foster,
by Merton D. Morse
Their Attorney.

Inventors:
George F. Devine,
Raymond F. Foster,
by Merton D. Moore
Their Attorney.

2,745,954
Patented May 15, 1956

2,745,954

INTERCARRIER WAVE TRANSLATION CIRCUITS

George F. Devine, Marcellus, and Raymond F. Foster, Syracuse, N. Y., assignors to General Electric Company, a corporation of New York Application October 29, 1952, Serial No. 317,482

4 Claims. (Cl. 250—20)

The present invention relates to intercarrier wave translation circuits and, more particularly, to improved intercarrier communication systems for the simultaneous translation of a plurality of intelligence-bearing electric waves. The invention has particular application to television receiving apparatus, and the like, of the intercarrier type.

According to present day standards of television broadcasting in the United States, the picture image intelligence is transmitted over an amplitude-modulated video carrier wave whose carrier frequency is maintained at a constant value. The sound or audio intelligence accompanying the video image is transmitted over a separate audio carrier wave. The audio carrier wave is frequency-modulated and its frequency varies in accordance with its modulation component about a mean carrier frequency which is also constant. By present day standards, as well as by government regulation, the video carrier wave frequency is separated in the frequency spectrum from the quiescent operating frequency, often referred to as the mean carrier or central frequency, of the audio carrier wave by 4.5 megacycles. This frequency difference, viz. 4.5 megacycles, is well in excess of the maximum fixed frequency component of the sound or audio signal that is transmitted.

It is well-known in the television art to employ intercarrier systems in television receiving apparatus. Although intercarrier systems may be employed in either the tuned-radio-frequency or superheterodyne type of television receiving apparatus, for well-known reasons, including in particular the many problems encountered in translating waves of the very high frequency and the ultra high frequency ranges currently used as television transmission carrier waves, the latter type of apparatus is employed at present almost to the complete exclusion of the former type.

In accordance with one well-known superheterodyne type of intercarrier system of television reception, the amplitude-modulated video carrier waves and the frequency-modulated audio carrier waves are intercepted by a suitable antenna system and, either with or without prior amplification, are supplied to the first detector stage of a television receiving apparatus where they are mixed with locally-generated oscillations to produce a video intermediate-frequency carrier wave and an audio intermediate-frequency carrier wave. After suitable amplification in a common translation channel, these two intermediate-frequency carrier waves are supplied to a second detector where they are mixed together according to well-known heterodyning principles. The output of the second detector includes a 4.5 megacycle wave corresponding to the difference frequency of the two carrier waves. This 4.5 megacycle difference frequency wave, or intercarrier wave, is frequency-modulated in accordance with the audio-modulation component of the frequency-modulated audio carrier wave. Thus, in effect, the amplitude-modulated video carrier wave acts as a source of local oscillations for heterodyning purposes.

The amplitude-modulated video wave and the 4.5 megacycle frequency-modulated intercarrier wave may then be amplified and detected to provide a varying direct voltage which may be further amplified, or otherwise translated, in accordance with conventional receiver principles, in order to provide suitable electric waves to energize a cathode-ray type picture tube and a loudspeaker as required for the reception of both picture and sound respectively.

Up to now, it has been conventional practice in intercarrier systems of this type to provide separate conduction control devices, generally of the electron discharge device type, for mixing the amplitude-modulated video intermediate-frequency waves with the frequency-modulated audio intermediate-frequency waves and for the detection of the amplitude-modulation component of the video intermediate-frequency wave.

It is a primary object of the present invention to provide an improved intercarrier translation circuit in which an intercarrier mixer and an amplitude-modulated wave detector are included in a single conduction control device.

It is another object of the present invention to provide an improved intercarrier translation circuit in which a single electron discharge device performs the functions of an intercarrier mixer, an intercarrier amplifier, and an amplitude-modulation wave detector.

It is still another object of the present invention to provide an improved intercarrier translation system in which a carrier wave having an amplitude-modulation component is employed as a source of heterodyning oscillations for a frequency-modulated wave.

It is a further object of the present invention to provide an efficient intercarrier television receiving apparatus in which a reduction in the number of conduction control devices heretofore required may be efficiently accomplished.

Briefly stated, according to one aspect of the present invention, there is provided an improved intercarrier mixer and an amplitude-modulation detector circuit comprising a conduction control device having an input electrode system upon which an amplitude-modulated wave and a frequency-modulated wave may be impressed. The same conduction control device also includes an output electrode system and a filtering means for deriving from the output system an intercarrier wave. The mean carrier frequency of the intercarrier wave corresponds to the frequency difference between the two input carrier waves and this intercarrier wave bears a frequency-modulation component corresponding to the frequency-modulated input wave. Means are also provided for deriving a rectified demodulation component from the amplitude-modulated input wave. These last-mentioned means comprise a detector circuit including the input electrode system of said conduction control device.

For additional objects and advantages, and for a better understanding of the invention, attention is now directed to the following description and accompanying drawings. The features of the invention which are believed to be novel are particularly pointed out in the appended claims.

Figures 1, 2:
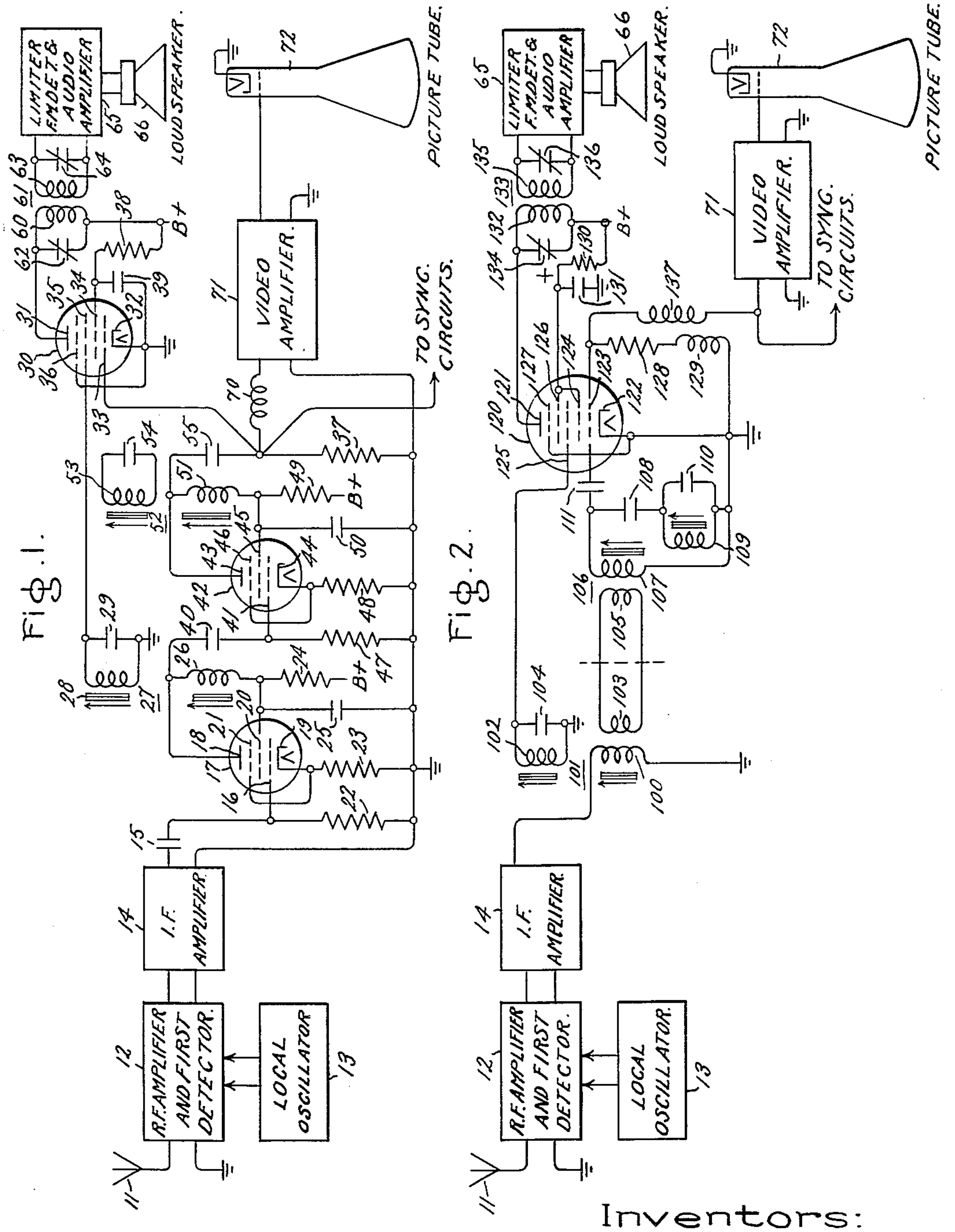
Fig. 1 is a schematic circuit diagram, partly in block form, of a television receiving apparatus embodying one form of the present invention.
Fig. 2 is a schematic circuit diagram, partly in block form, of a television receiving apparatus embodying another form of the present invention.

Referring to Fig. 1, there is shown an antenna system 11 adapted to receive television signals including both a frequency-modulated audio carrier wave and an amplitude-modulated video carrier wave. As previously mentioned above, in accordance with current standards of television broadcasting, these two carrier waves are spaced apart in frequency by 4.5 megacycles. Antenna system 11 is connected to one or more stages of radio-frequency amplification followed by a first detector stage, both of which are represented by the box 12 in the diagram. A source of local oscillations 13 is also connected to the detector stage in a conventional manner. The output of the first detector is connected to one or more stages of intermediate-frequency amplification 14. All these elements are shown in simplified block form since they are well-known and their details form no part of the present invention.

A coupling capacitor 15 connects the last-mentioned amplifier circuit to the control grid 16 of a first electron discharge device 17 which, together with its associated circuit elements, comprises another stage of intermediate-frequency amplification. Device 17 is preferably of the pentode type as shown, and includes an anode 18, a cathode 19, a control grid 16, a screen grid 20, and a suppressor grid 21. A grid resistor 22 is connected between control grid 16 and common ground in conventional manner. Likewise, the cathode 19 of device 17 is connected to common ground through a cathode resistor 23. The suppressor grid 21 is connected directly to the cathode 19 and the screen grid 20 is connected to the positive side of a suitable source of operating potential (not shown) through a resistor 24. The negative side of the source is connected to ground in conventional manner. A screen by-pass capacitor 25 connects grid 20 to ground. The anode 18 of device 17 is connected through the tunable primary winding 26 of an output transformer 27 in series with resistor 24 to the positive side of the source of anode operating potential. The tunable secondary winding 28 of transformer 27 is connected in parallel with capacitor 29 between the second control grid 35 of a mixer device 30 and ground. The mixer device 30 is described more fully at a later point in this specification.

A coupling capacitor 40 connects the anode of device 17 to the control grid 41 of a second electron discharge device 42 which is also preferably of the pentode type as shown, comprising an anode 43, a cathode 44, a control grid 41, a screen grid 45 and a suppressor grid 46. The device 42, in cooperation with its associated circuit elements, comprises a further intermediate-frequency amplifier for the video intermediate-frequency waves. A grid resistor 47 connects grid 41 to ground. The cathode 44 of device 42 is connected to common ground through a cathode resistor 48. The suppressor grid 46 is connected to the cathode 44 and the screen grid 45 is connected through a dropping resistor 49 to the source of operating potential in the usual manner. A screen grid by-pass capacitor 50 is connected from grid 45 to common ground. The anode 43 of device 42 is connected through the tunable primary winding 51 of an output transformer 52 in series with the dropping resistor 49 to the positive side of the source of operating potential. The tunable secondary winding 53 of transformer 52 is connected in parallel resonant circuit with a capacitor 54 to form an attenuator for waves of its resonant frequency.

A coupling capacitor 55 connects the anode 43 of device 42 to a first control electrode 33 of the mixer electron discharge device 30. Device 30 may be any conventional mixer tube having a pair of control grids, and in the present illustration includes an anode 31, a cathode 32, a first control grid 33, a screen grid 34, a second control grid 35 and a suppressor grid 36. Although device 30 is shown as having four grids as described above, it is included in a mixer circuit that is basically the same as that of a pentagrid converter. A grid resistor 37 is connected from grid 33 to the grounded cathode 32 of device 30. As mentioned above, the second control electrode 35 of device 30 is connected to the upper terminal of the parallel resonant circuit comprising winding 28 and capacitor 29. The screen grid 34 is connected through a resistor 38 to the positive side of the source of operating potential. A screen by-pass capacitor 39 connects the screen grid 34 to common ground. The suppressor grid 36 is connected directly to the cathode 32 which, in turn, is connected to ground. The anode 31 of device 30 is connected through the primary winding 60 of an output transformer 61 to the positive side of the source of operating potential. A variable capacitor 62 is connected across primary winding 60 and cooperates with said winding to form a tuned output circuit for the mixer device 30.

The tuned secondary winding 63 of transformer 61 is connected in parallel with a variable capacitor 64 to form a tuned input circuit to a conventional limiter stage. The limiter is followed by a conventional frequency-modulation audio detector which, in turn, is connected to one or more subsequent stages of audio amplification, all as represented by the box 65 in the diagram. The audio amplifier is connected in turn to a loudspeaker 66 for the conversion of electric waves to sound waves in a conventional manner.

Device 30 also functions as a peak detector for detecting the video signal impressed upon its first control grid 33. This detector circuit also includes the resistor 37 and the capacitor 55. In addition to serving as grid resistor and coupling capacitor respectively, the two last-mentioned elements also serve another purpose, viz., resistor 37 cooperates with capacitor 55 to form the load impedance of the video detector circuit.

A radio-frequency choke coil 70 is connected from the junction between grid 33 and resistor 37 to the input of a video amplifier 71. The video amplifier 71, which may be entirely conventional, may include one or more stages of amplification and is connected to the control electrode of a cathode-ray type picture tube 72 for the conversion of electrical energy to the television picture image in well-known manner. At the point of the video detector output with respect to ground, i. e., the junction between grid 33 and resistor 37, a connection is shown to the synchronizing circuits which in a conventional manner synchronize the cyclical operation of the image scanning apparatus of the receiver with that of the television transmitter.

Briefly stated, the above-described circuit operates in the following manner. A frequency-modulated audio carrier wave and an amplitude-modulated video carrier wave, whose carrier frequency is 4.5 megacycles above the mean carrier frequency of the audio carrier wave, are received by the antenna system 11 and supplied to the radio-frequency amplifier 12. After the desired amplification, the two carrier waves are applied to the electrodes of a first detector 12 where they are combined with locally-generated oscillations from the local oscillator 13 to produce a pair of intermediate-frequency carrier waves bearing the same modulation components as the corresponding waves received at the antenna 11. The frequency of the locally-generated oscillations is such that the intermediate-frequency waves are of a convenient value for further amplification by the intermediate-frequency amplifier 14 to which they are supplied. The value of these waves may, for instance, be 41.25 megacycles for the audio intermediate-frequency carrier and 45.75 megacycles for the video intermediate-frequency carrier. Since the intermediate-frequency amplifier must translate both of these carrier waves in a single channel, it is required that the tuning of this amplifier be sufficiently broad to accommodate both carrier waves as well as their modulation components.

As previously mentioned, the output of the intermediate-frequency amplifier 14 is coupled to the control electrode 16 of intermediate-frequency amplifier 17. This circuit is a conventional pentode amplifier circuit and operates as such. The point of emphasis for present purposes is that there are two output paths from this amplifier. One output path is through transformer 27 and the other is through capacitor 40.

The primary winding 26 of transformer 27 together with the associated circuit capacitance of device 17 is tuned to resonate at the band of frequencies including the audio intermediate-frequency of 41.25 megacycles and its frequency-modulation component in order to accept waves of that frequency and reject all others, and particularly to reject the video intermediate-frequency waves. Likewise, transformer 27 also has its secondary circuit, namely, winding 28 in parallel with capacitor 29, tuned to select the audio intermediate-frequency of 41.25 megecycles and its frequency-modulation component. Audio intermediate-frequency waves are thus fed through transformer 27 to the second control grid 35 of the mixer device 30 where they are mixed with electric waves applied to the first control grid 33.

The 41.25 megacycle amplitude-modulated carrier waves appearing in the plate circuit of device 14 are coupled by the capacitor 40 to the next following stage of intermediate-frequency amplification which includes the device 42. The amplifier circuit associated with device 42 is similar to and operates in a similar manner to that circuit associated with device 17. The tunable primary winding 51 of output transformer 52 is adjusted to tune the output circuit including the circuit capacitance and winding 51 to resonance at the mid-band frequency of 44.12 megacycles. Secondary winding 53 of transformer 52 is also tuned to resonate the circuit including capacitor 54 at the sound intermediate-frequency wave of 41.25 megacycles to provide a low impedance path for waves in the vicinity of its resonant frequency. This circuit is commonly known as a wave-trap whose function in the present application is to provide a convenient means for attenuating audio intermediate-frequency components that may be present in the output of the device 42. As is well-known, it provides an effective short circuit for waves of its resonant frequency in a well-known manner.

Those electrical waves remaining in the output circuit of device 42 after the removal of the video carrier waves, namely, the 45.75 megacycle picture intermediate-frequency carrier wave and its associated side bands, are connected to the first control grid 33 of mixer device 30 through the coupling capacitor 55.

It is seen from the foregoing that, as between the video intermediate-frequency waves and the audio intermediate-frequency waves, substantially only the former are amplified by the amplifying device 42. Thus, it is apparent that the video waves introduced on the first control grid 33 of the mixer 30 are of considerably greater intensity than the audio waves simultaneously introduced on the second control grid 35 of the mixer. This difference in intensity of the two waves tends to reduce the amount of cross-modulation between the sound and video signals in the mixer.

Video modulated carrier waves are injected on the first grid 33; simultaneously, audio modulated carrier waves are injected on the second control grid 35. Due to the non-linearity of the device 30, the output of this device will include a heterodyne component whose frequency will be the difference between the two mixed frequencies injected on the first and second control grids 33 and 35 respectively. Thus, the output of device 30 includes an intercarrier wave whose mean carrier frequency is 4.5 megacycles, and which bears a frequency-modulation component corresponding to that of the audio carrier wave. Both the primary winding 60 and the secondary winding 63 of transformer 61 are tuned by the respective variable capacitors 62 and 64 to accept only this frequency-modulated 4.5 megacycle intercarrier wave and its frequency-modulated component in order to couple it to the conventional audio limiter stage which follows, and thence to the frequency-modulation detector and amplifier 65 in the order named.

The limiter may be of any well-known type suitable for removing amplitude variations from the frequency-modulated wave. As is well-known, all waves above a certain designated amplitude are attenuated in the limiter in order to reduce interfering noise that may be present along with the desired signal.

The audio detector circuit may be a conventional discriminator circuit for the conversion of frequency-modulation components to a voltage whose amplitude varies at a corresponding rate. The voltage amplitude fluctuations produced by the audio detector may then be supplied to one or more stages of audio amplification in order to provide an electric wave of sufficient intensity to energize a loudspeaker or similar electroacoustic device.

Device 30 also functions as a conventional diode detector for the video signals impressed on grid 33. Amplitude-modulated intermediate-frequency video waves are impressed upon grid 33 which acts as the anode of the detector rectifier. Due to the unidirectional conducting properties of the effective diode comprising cathode 32 and grid 33, conduction will occur in this circuit only when the grid 33 is of positive potential with respect to the cathode 32. During the positive portion of the video modulation component, the grid 33 is positive and current flows through resistor 37. Capacitor 55 and the stray circuit capacitance which tends to take on a charge during this half of the cycle aids in smoothing the current flow through resistor 37 by producing a flow of current through resistor 37 during the negative portion of the modulation component. As grid current flows through resistor 37, a voltage drop with respect to ground appears across said resistor and this voltage is fed through radio-freqeuncy choke coil 70 to the one or more stages of video amplification 71. Although choke 70 readily passes video and direct voltages appearing across resistor 37, it offers a high impedance to the intermediate-frequency carrier waves which are also present across resistor 37, thus filtering them out of the video amplifier circuit.

The video amplifier output is connected to the control electrode of a suitable picture tube 72 which is preferably of the cathode-ray type as shown. Thus, in a conventional manner, the video signals are employed to control the intensity of the electron beam used to produce the television picture image.

A connection is also made to the side of resistor 37 remote from ground to provide a path from the detector output to the synchronizing circuits. As briefly mentioned above, the synchronizing circuits receive impulses from the television transmitter along with the video signals and utilize these synchronizing pulses to synchronize the horizontal and vertical scanning circuits that produce the picture raster of the cathode-ray picture tube with the scanning circuits of the television camera which supplies the transmitting apparatus.

Attention is now directed to Fig. 2. Those elements in Fig. 2 bearing the same reference numerals as certain of the elements shown in Fig. 1 are identical therewith. Thus, as is apparent from a comparison of the first and second figures, the portion of the two circuits from antenna system 11 through the intermediate-frequency amplifier 14 is identical in both figures.

In Fig. 2, the output of the intermediate-frequency amplifier 14 is connected directly to the tunable primary winding 100 of an output transformer 101. Winding 100, in cooperation with stray circuit capacitance, is tuned broadly to accept both the 41.25 megacycle audio carrier wave along with its frequency-modulation components and the 45.75 megacycle video carrier wave. The output circuit of transformer 101 includes two secondary windings 102 and 103. Winding 102 is of the tunable type and has a capacitor 104 connected across its terminals to form a parallel resonant circuit having one end thereof connected to ground and the other end connected to the second control grid 125 of a mixer device 120 which is described in greater detail below. The parallel resonant circuit including winding 102 and capacitor 104 is tuned to resonate broadly in order to accept a band of frequencies including the 41.25 megacycle audio wave and its frequency-modulation component. The tuned circuit including winding 102 and capacitor 104 corresponds to the tuned circuit of Fig. 1 which includes winding 28 and capacitor 29, and, like its corresponding circuit, the circuit of Fig. 2 functions as a tuned input circuit for the second control grid 125 of the mixer device 120. Device 120, likewise, corresponds generally to mixer device 30 of Fig. 1.

Secondary winding 103 of transformer 101 is the input winding of a link-coupling circuit connecting the intermediate-frequency amplifier 14 to the first control electrode 123 of the mixer device 120. The output winding 105 of the link-coupling circuit is the primary winding of an input transformer 106. The tunable secondary winding 107 of transformer 106 is part of the parallel resonant input circuit that supplies video signal waves to the first control grid 123 of the mixer device 120.

The input circuit to the first grid 123 of device 120 comprises a parallel resonant circuit including the tunable winding 107 in parallel with a series circuit including a capacitor 108 and a parallel resonant attenuator, commonly known as a wave-trap, which in turn comprises a tunable inductor 109 and a capacitor 110 in parallel. The wave-trap is tuned to the 41.25 megacycle audio frequency wave and its frequency-modulation components to provide a low impedance path to ground for waves of that frequency range in order effectively to attenuate those waves and exclude them from the input circuit to the grid 123.

The junction between winding 107 and the wave-trap 109, 110 is connected to ground. The junction between winding 107 and capacitor 108 is connected through a coupling capacitor 111 to the first control grid 123 of device 120. Device 120 is a conventional pentagrid tube and it comprises an anode 121, a cathode 122, a first control grid 123, a first screen grid 124, a second control grid 125, a second screen grid 126, and a suppressor grid 127. A grid resistor 128 connects grid 123 to ground through a radio-frequency choke coil 129. The cathode 122 of device 120 is connected to ground. The second control grid 125, as mentioned above, is connected to the tuned circuit 102, 104.

The screen grids 124 and 126 are situated on opposite sides of the second control grid 125. The two screen grids 124 and 126 are connected together, preferably by a connection within the envelope of the device 120 as shown, and are connected through a common screen grid resistor 130 to the positive side of the source of operating potential in the usual manner. A screen by-pass capacitor 131 is connected between the screens 124, 126 and ground. A suppressor grid 127 is connected to the cathode 122, preferably by a direct connection within the envelope of device 120 as shown. The anode 121 of device 120 is connected through the primary winding 132 of output transformer 133 to the positive side of the source of operating potential.

A variable capacitor 134 is connected across the terminals of winding 132 to form a parallel resonant output circuit for the mixer device 120. The secondary winding 135 of transformer 133 is also tuned to resonance by a variable capacitor 136 connected across its terminals to form a parallel resonant input circuit for the following stages which are identical with those of Fig. 1, and which bear the same numerical designations.

The first control grid 123 in cooperation with cathode 122 of the device 120 functions as a diode detector for the video waves impressed on grid 123. In such case, the grid resistor 128 in cooperation with capacitor 111 and winding 107 comprises a rectifier load impedance. The rectified output of the detector is derived across the load impedance including resistor 128. Hence, the upper terminal of resistor 128 is connected through a radio-frequency choke coil 137 to the remainder of the video circuit including the synchronizing circuit as well as the video amplifier 71 and the picture tube 72. The portion of the circuit following choke coil 137 may be identical with the corresponding portion of the circuit shown in Fig. 1 which bears identical numerical designations.

The operation of the circuit shown in Fig. 2 is similar to the operation of the circuit shown in Fig. 1. However, instead of relying upon additional stages of intermediate-frequency amplification for the video signal in order to isolate the audio and video waves from one another, reliance is placed upon the link-coupling arrangement in order to isolate the two waves and thus reduce cross-modulation.

Figure 3:
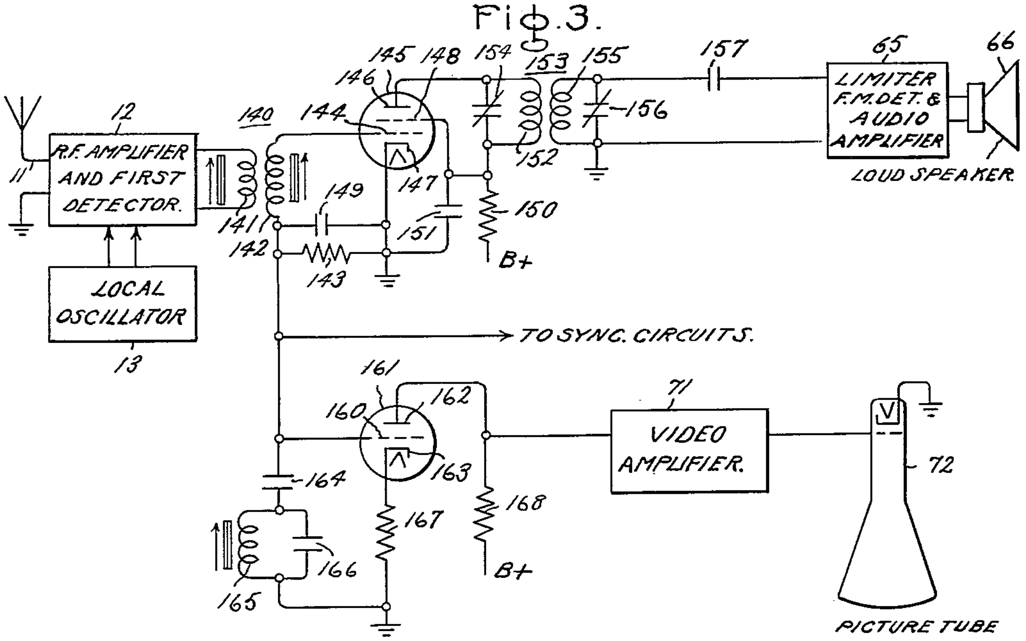
Fig. 3 is a schematic circuit diagram, partly in block form, of a television receiving apparatus embodying still another form of the present invention.

Still another modification of the invention is shown in Fig. 3. The portion of the circuit shown in Fig. 3 from antenna 11 through the detector 12 may be the same as the corresponding portions of the two previous circuits. However, the first intermediate-frequency amplifier 14 has been omitted in the instant figure and the output of the first dectector is coupled by means of a transformer 140 directly to a single intermediate-frequency amplifier 145 which also functions as the intercarrier mixer stage and the video detector. Both the tunable primary winding 141 and the tunable secondary winding 142 of transformer 140 are employed to tune the output of the first detector and the input of the device 145, respectively, to accept the 41.25 megacycle sound intermediate-frequency carrier wave and the 45.75 megacycle frequency video intermediate-frequency carrier wave. The secondary winding 142 has one of its two terminals connected through a load resistor 143 to ground and the other terminal connected to the control grid 144 of electron discharge device 145. Device 145 may be of the tetrode type as shown, comprising an anode 146, a cathode 147, a control electrode 144 and a screen grid 148. Cathode 147 is connected to ground. As mentioned above, control grid 144 is connected through winding 142 and resistor 143 to ground. A capacitor 149 is connected across load resistor 143. Screen grid 148 is connected through resistor 150 to the positive side of the source of operating potential. A screen by-pass capacitor 151 is connected between grid 148 and ground in conventional manner. The anode 146 is connected through the primary winding 152 of an output transformer 153 in series with resistor 150 to the positive side of the source of operating potential.

The output circuit associated with device 145 comprises the primary winding 152 in parallel with a variable capacitor 154. Capacitor 154 is employed to tune the output circuit broadly to accept the frequency band including the 4.5 megacycle intercarrier wave and its frequency-modulation component. The secondary winding 155 of transformer 153 is similarly tuned to resonate at the intercarrier frequency of 4.5 megacycles by a variable capacitor 156. Winding 155 and capacitor 156 form a tuned resonant input circuit for a limiter stage. One terminal of winding 155 is connected to ground and the other terminal is connected through a coupling capacitor 157 to the limiter and succeeding stages represented by the box 65, which may be identical to the corresponding portions of Figs. 1 and 2.

As mentioned above, device 145 also functions as a video detector. More specifically, cathode 147 and grid 144 function as the cathode and anode, respectively. of a diode detector. Resistor 143 and capacitor 149 provide the series load impedance of a conventional peak detector circuit. The detector output appears across the detector load impedance with respect to ground and is supplied to a conventional video amplifier.

In the illustrated embodiment, the side of resistor 143 remote from the ground is coupled by means of a direct connection to the control grid 160 of a video amplifier comprising electron discharge device 161; however it is not essential to the invention that this coupling be by a direct connection in all cases. Device 161 may be any electron discharge device suitable for amplifying the video signal and in the illustrated case is a triode comprising an anode 162, a cathode 163, and a control grid 160. Grid 160 is connected to a capacitor 164 which, in turn, is connected to ground through a parallel-resonant circuit comprising a tunable inductance 165 in parallel with a capacitor 166. This entire circuit is preferably tuned broadly to accept the 41.25 megacycle audio wave and its associated carrier components in order to produce a low impedance path to ground for waves of that band and thus attenuate them sufficiently to prevent interference thereby in the video circuit. It is understood, of course, that the foregoing circuit should nevertheless be adjusted to provide a sufficiently high impedance path to ground at the video frequency range in order not to attenuate excessively the video signal wave applied to the grid 60. The cathode 163 is connected to ground through a cathode resistor 167. The anode 162 is connected to the positive side of the source of operating potential through a load resistor 168 in a conventional manner. The anode 162 is also coupled by means of a direct connection to the video amplifier 71, but coupling means other than a direct connection may be employed. Amplifier 71 and the subsequent picture tube 72 are identical with the corresponding parts of the two preceding figures.

In operation, the audio and video intermediate-frequency carrier waves and their respective modulation components present in the output circuit of the first detector, are simultaneously impressed upon the single control grid 144 of device 145 through transformer 140. Device 145, in accordance with conventional mixer design, has a plate characteristic which is non-linear with respect to the control grid voltage. Therefore, a heterodyning mixing action occurs in device 145, producing heterodyne components of the two input signals applied to the grid 144. These heterodyne components include a wave whose frequency is determined by the difference of the two input frequencies and which bears a modulation component corresponding to that of the frequency-modulated audio input wave. The intercarrier wave output of the mixer is coupled by means of transformer 153 and capacitor 157 to the limiter and the successive stages which, as mentioned above, comprise the detector and audio amplifier 65 whence electrical energy is applied to the loudspeaker 66 for the conversion of electrical waves to sound waves in a well-known manner. The amplitude-modulated component of the video carrier wave is detected by the rectifying action of the effective diode comprising grid 144 and cathode 147 to produce, in a conventional manner, a varying direct current that corresponds to the amplitude-modulation component of the carrier wave impressed upon grid 144.

As mentioned above, the output waves of device 161 are connected to video amplifier 71 and picture tube 72 corresponding to like elements in Figs. 1 and 2.

It is to be understood that it is not intended to limit the scope of the present invention by the particular detector circuits shown in the illustrated figures. The detector circuits there shown are intended merely to exemplify various means for utilizing the electrodes of the intercarrier mixer device for detecting the video amplitude-modulation component and these demonstrative detector circuits are not intended to be exhaustive of possible detectors within the scope of the present invention as claimed.

It is believed to be apparent that the present invention provides an improved intercarrier translation circuit in which the intercarrier mixer and amplitude-modulated wave detector are included in a single conduction control device and which has particular utility in conventional superheterodyne television receiving apparatus.

While specific embodiments have been shown and described, it will, of course, be understood that various modifications may be made without departing from the principles of the invention. The appended claims are therefore intended to cover any such modifications within the true spirit and scope of the invention.

What we claim as new and desire to secure by Letters Patent of the United States is:

1. In a high frequency circuit adapted to translate simultaneously an amplitude-modulated wave and a first frequency-modulated wave spaced apart in frequency from one another by a predetermined frequency difference, means for combining said amplitude-modulated wave and said first frequency-modulated wave to produce a second frequency-modulated wave, said second frequency-modulated wave having a mean carrier frequency equal to the difference between said amplitude-modulated wave and said first frequency-modulated wave, said means comprising an electron discharge device including an anode, a cathode, and first and second control electrodes, means for impressing said amplitude-modulated wave on said first electrode, means for impressing said first frequency-modulated wave on said second electrode, an anode-to-cathode path for said device comprising filtering means for selecting said second frequency-modulated wave, and means for demodulating said amplitude-modulated wave comprising a detector circuit including said first electrode and said cathode.

2. In a television receiving apparatus, means for receiving an amplitude-modulated wave, means for receiving simultaneously with said amplitude-modulated wave a first frequency-modulated wave having a mean carrier frequency that is spaced apart in frequency from said amplitude-modulated wave by a predetermined frequency difference, means for amplifying said waves in a common channel, means for separating said amplitude-modulated wave and said first frequency-modulated wave, means for combining said two separated waves to produce a second frequency-modulated wave whose mean carrier frequency is equal to the difference between said amplitude-modulated wave and said first frequency-modulated wave, said means for combining said waves comprising an electron discharge device including an anode, a cathode, and first and second control electrodes, means for impressing said amplitude-modulated wave on said first electrode, means for impressing said first frequency-modulated wave on said second electrode, an anode-to-cathode path for said device comprising filtering means for selecting said second frequency-modulated wave, and means for demodulating said amplitude-modulated wave comprising a detector circuit including said first electrode and said cathode.

3. In a television receiving apparatus, means for receiving an amplitude-modulated wave, means for receiving simultaneously with said amplitude-modulated wave a first frequency-modulated wave having a mean carrier frequency that is spaced apart in frequency from said amplitude-modulated wave by a predetermined frequency difference, means for converting said amplitude-modulated wave and said first frequency-modulated wave to corresponding intermediate-frequency waves, means for amplifying said intermediate-frequency waves in a common channel, means for separating said intermediate frequency waves, means for combining said intermediate-frequency waves to produce an intercarrier frequency-modulated wave whose mean carrier frequency is equal to the difference between said amplitude-modulated wave and said first frequency-modulated wave, said means for combining said waves comprising an electron discharge device including an anode, a cathode, and first and second control electrodes, means for impressing said amplitude-modulated intermediate-frequency wave on said first electrode, means for impressing said first frequency-modulated intermediate-frequency wave on said second electrode, an anode-to-cathode path for said device comprising filtering means for selecting said intercarrier frequency-modulated wave, and means for demodulating said amplitude-modulated intermediate-frequency wave comprising a detector circuit including said first electrode and said cathode.

4. In a high frequency circuit adapted to translate simultaneously an amplitude-modulated wave and a first frequency-modulated wave spaced apart in frequency from one another by a predetermined frequency difference, means for combining said amplitude-modulated wave and said first frequency-modulated wave to produce a second frequency-modulated wave, said second frequency-modulated wave having a mean carrier frequency equal to the difference between said amplitude-modulated wave and said first frequency-modulated wave, said means comprising an electron discharge device including an anode, a cathode, and first and second control electrodes, means for impressing said amplitude-modulated wave on said first electrode, means for impressing said first frequency-modulated wave on said second electrode, an anode-to-cathode path for said device comprising filtering means for selecting said second frequency-modulated wave, and means for demodulating said amplitude-modulated wave comprising a diode type detector circuit including said first electrode, said cathode, and an impedance element connected in circuit between said first electrode and said cathode.

References Cited in the file of this patent

UNITED STATES PATENTS

| | | |
|---|---|---|
| 2,250,862 | Farrington | July 29, 1941 |
| 2,491,809 | Fyler | Dec. 20, 1949 |
| 2,642,491 | Cotsworth | June 16, 1953 |

FOREIGN PATENTS

| | | |
|---|---|---|
| 553,357 | Great Britain | May 18, 1943 |